E. M. & W. W. BOIES.
MACHINE FOR SCOURING EGGS.
APPLICATION FILED JULY 3, 1907.
901,774.
Patented Oct. 20, 1908.
3 SHEETS—SHEET 3.
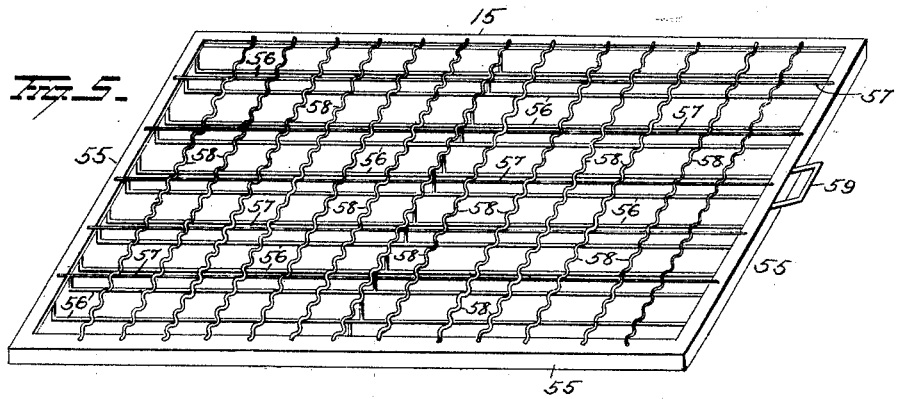
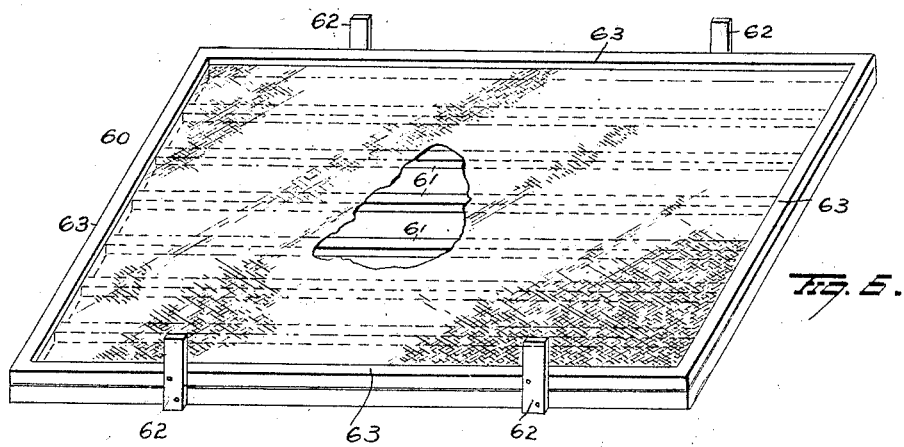
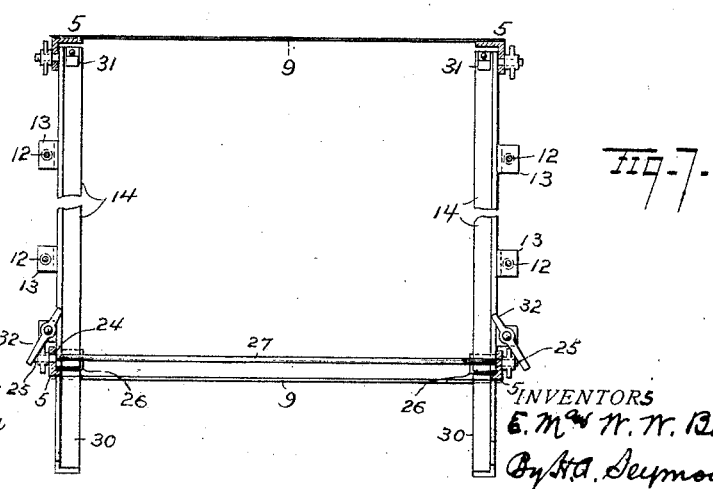

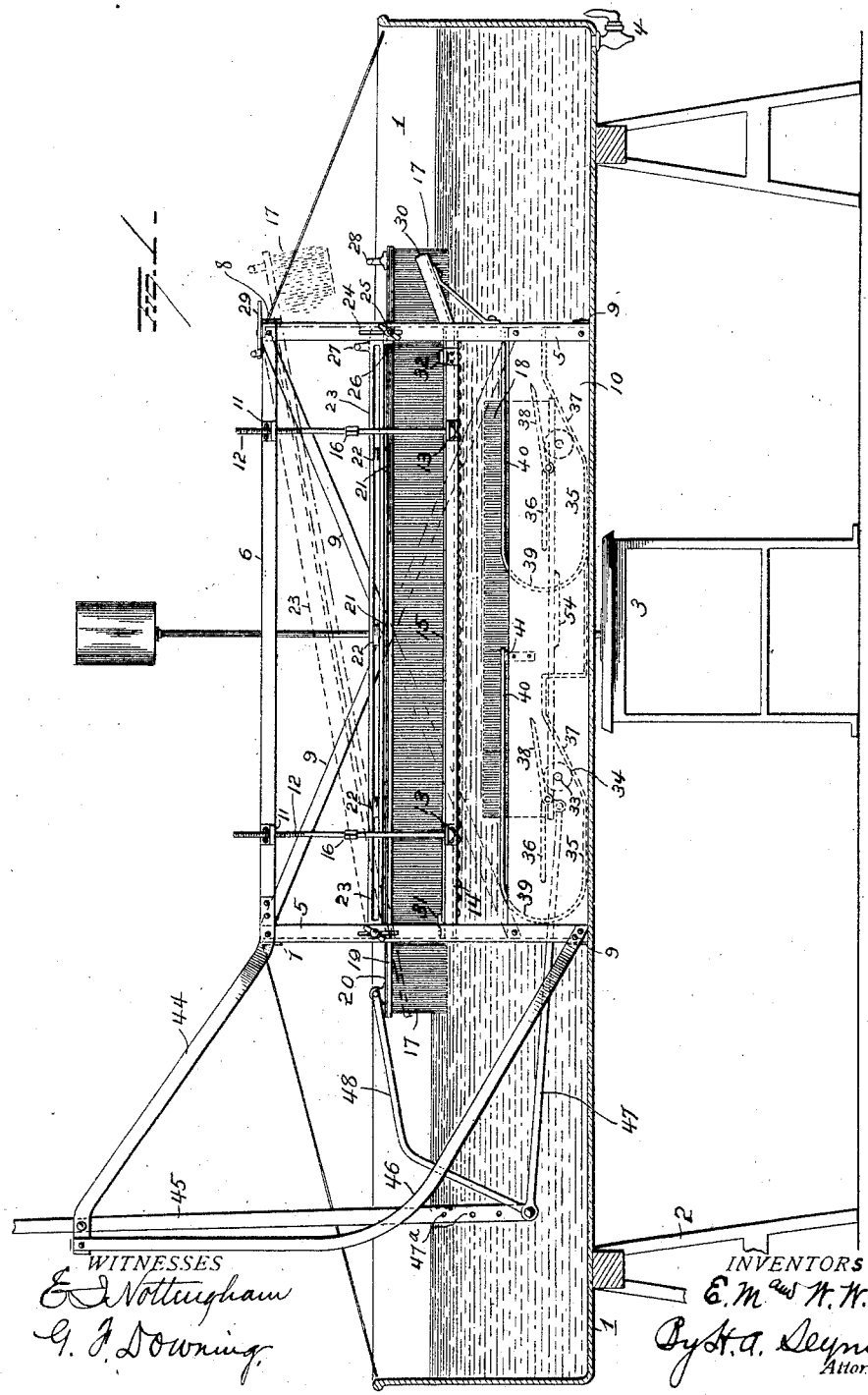

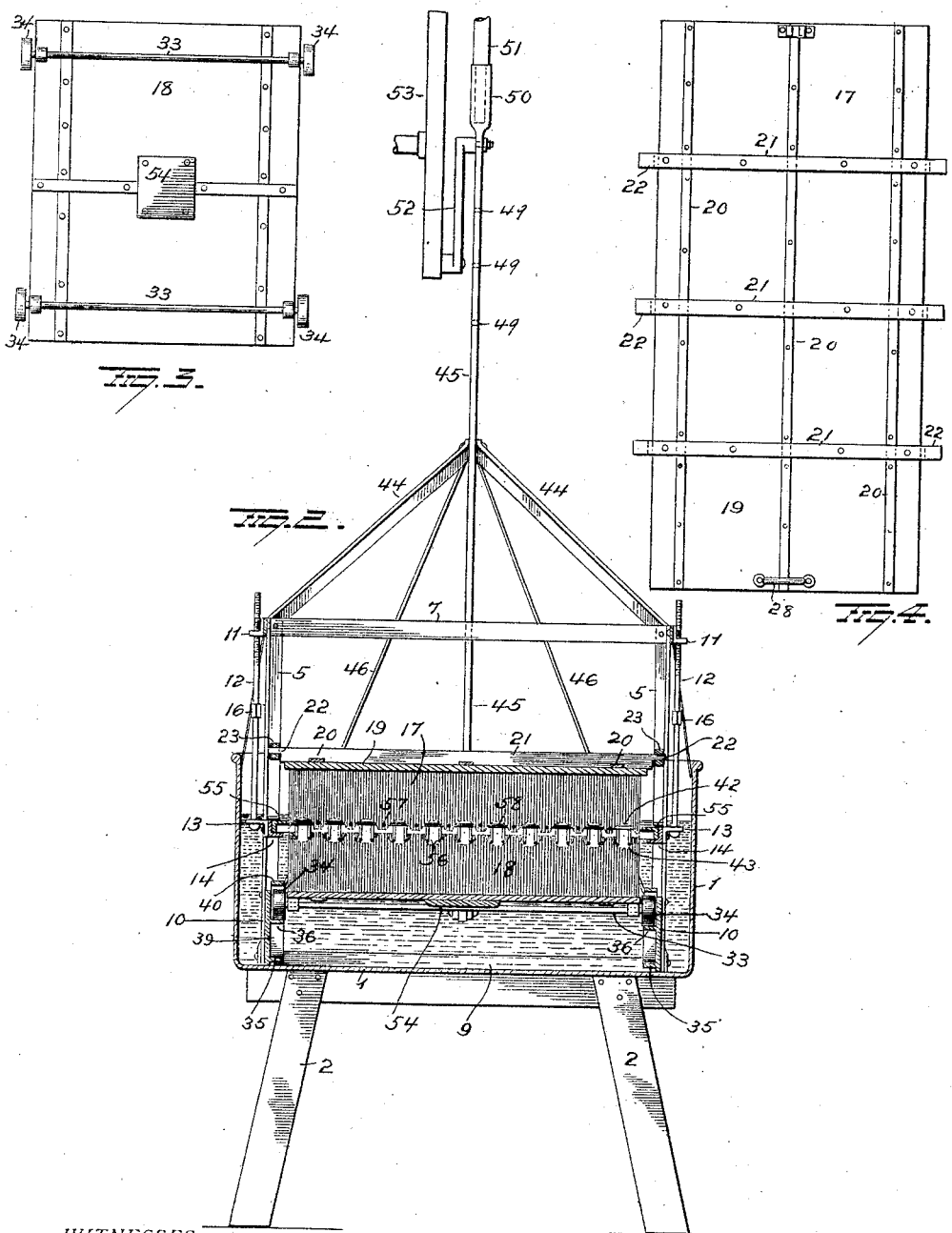

UNITED STATES PATENT OFFICE.

EDWARD M. BOIES AND WILLIAM W. BOIES, OF YARMOUTH, IOWA.

MACHINE FOR SCOURING EGGS.

No. 901,774.   Specification of Letters Patent.   Patented Oct. 20, 1908.

Application filed July 3, 1907. Serial No. 382,050.

*To all whom it may concern:*

Be it known that we, EDWARD M. BOIES and WILLIAM W. BOIES, of Yarmouth, in the county of Des Moines and State of Iowa, have invented certain new and useful Improvements in Machines for Scouring Eggs; and we do hereby declare the following to be a full, clear, and exact description of the invention, such as will enable others skilled in the art to which it appertains to make and use the same.

Our invention relates to improvements in cleaning apparatus and more particularly to a machine for washing and scouring eggs,— an object of the invention being to provide a machine by means of which a large number of eggs can be thoroughly washed in a short time and the liability of breakage reduced to a minimum.

A further object is to so construct the machine that the eggs can be scoured simultaneously on diametrically opposite sides and so that the eggs will be automatically turned to present new faces to the action of the brushes.

A further object is to so construct the machine that the tray which holds the eggs can be adjusted relatively to the brushes above and below the same.

A further object is to construct the machine in such manner that the upper scouring brush can be adjusted vertically to regulate and control the pressure thereof upon the eggs.

A further object is to provide a machine of the character specified, with instrumentalities whereby the machine can be made to operate upon a large number of eggs with little liability of breaking them, and which will facilitate the ready handling of the eggs in placing them into the machine and removing them therefrom.

A further object is to construct an egg washing machine in such manner that it can be operated manually or so that it can be operated by means of a suitable motor.

With these objects in view the invention consists of a machine comprising a frame, brushes mounted to reciprocate therein, means for holding eggs between said brushes, and means for reciprocating the brushes.

The invention further consists in various novel features of construction and combinations of parts as hereinafter set forth and pointed out in the claims.

In the accompanying drawings, Figure 1 is a side elevation with the tank shown in longitudinal section and the lower brush depressed; Fig. 2 is a transverse sectional view with the lower brush elevated. Fig. 3 is a bottom plan view of the lower brush; Fig. 4 is a top plan view of the upper brush; Fig. 5 is a perspective view of the egg-holding tray; Fig. 6 is a perspective view of the drying tray, and Fig. 7 is a horizontal sectional view of the framework.

1 represents a tank constructed of any suitable material, in which our improved machine is located and adapted to be operated. This tank is elevated by means of suitable supports 2 so as to provide space under it for the reception of a suitable heater 3 for heating water contained in the tank, and the latter is provided with a suitable discharge cock 4, by means of which the water can be withdrawn after a number of trays of eggs have been washed.

As above stated, the machine is located within the tank 1 and the frame of said machine comprises a series of corner-posts or uprights 5, the upper ends of which are connected by side-bars 6 and end-bars 7, 8. The lower ends of the uprights 5 are connected, at the ends of the framework by cross-bars 9 and at each side of the frame, plates 10 are secured at their ends to the uprights 5 at the base of the latter.

Clips 11 are secured to the upper-side-bars 6 of the frame and through these clips, the upper threaded ends of rods 12 pass, the lower ends of said rods being swiveled to clips 13 secured to bars 14 which constitute a holder or support for a tray 15 hereinafter more fully described. Each rod 12 is provided with an angular portion 16 for the reception of a wrench for turning it to adjust the tray-holder or support vertically.

Brushes 17 and 18 are located respectively above and below the tray-supports 14. The back 19 of the upper brush 17 is braced and prevented from warping by means of longitudinally disposed rods 20. A series of bars 21 secured upon the back of the upper brush 17, project beyond the side edges of said brush and are made with shoulders 22 mounted in slotted bars 23 at respective sides of the framework so that when the brush 17 is reciprocated the shouldered ends of the bars 21 will slide on the bars 23. The corner-posts or uprights 5 are provided with vertical elongated slots 24 for the reception of bolts 25 by means of which blocks 26 are adjustably secured to said posts or uprights and serve to support the slide-bars 23. The latter are connected at one end of the machine by means of a cross-rod 27 which passes over the upper brush 17. The brush 17 is provided at one end with a handle 28 by means of which said brush can be raised, and when thus raised the slide-bars 23 will also be elevated and the whole sustained in an elevated position by means of a support 29 attached to end cross-bar 8 of the framework. This will permit the placing of a tray 15 containing the eggs within the machine. To facilitate the insertion of the tray 15, inclined angle-iron guides 30 are secured to the rear uprights 5 and serve to guide said tray onto the tray-supporting bars 14. When the tray shall have been fully inserted its forward end will be engaged by lips 31 at the forward ends of the bars 14 to prevent vertical displacement of the tray at the forward end of the machine and at the opposite end of the machine vertical displacement of the tray will be prevented by means of a thumb-lever 32.

The bristles of the lower brush 18 project upwardly toward the egg-tray and to the back of this brush, axles 33 are secured and provided at their ends with wheels 34 which run on track-ways 35 and 36 secured to the plates 10, at the sides of the framework. The lower track 35 is horizontal throughout a portion of its length and another portion is inclined as indicated at 37. Each upper track 36 is made with a pivoted forward portion 38, the free end of which normally terminates at or near the upper end of the inclined portion 37 of the lower track. From this construction it will be seen that when the wheels 34 of the brush 18 are upon the horizontal portion of the lower tracks, the brush will not engage eggs in the tray 15. As the wheels of the lower brush ride up the inclined portions 37 of the track-ways they will engage the hinged portions 38, raise the latter and then pass the same, permitting said hinged track-sections 38 to drop and form (with the track-sections 36) continuous horizontal upper-track-ways. When the wheels 34 shall have arrived at the top of the inclined track-sections, the brush 17 will be in position to engage the under sides of the eggs in tray 15. When the brush 18 moves back on the track-way 36–38, it will brush the bottom faces of the eggs and when it completes this movement the wheels 34 will run off of the upper-trackway and be guided onto the lower track-way by curved track sections 39. In order to prevent the hinged track-sections 38 from being thrown up too far, guards 40 are secured at the upper edges of the plates 10, one of said guards being secured to a projection 41 on plate 10 and the other to corner-post 5.

The faces of the brushes are made corrugated by properly cutting the ends of the bristles, as shown at 42 and 43, Fig. 2, so as to more readily adapt them for cleaning the curved surfaces of the eggs.

Bars 44 are secured to corner-posts 5 at the ends of end-bar 7 and converge to form a support for a pivoted operating lever 45. This support is braced by means of bars 46 which extend therefrom to the lower corners of the framework. A rod or pitman 47 connects the lower end of the operating lever 45 with one end of the lower brush 18. Another rod or pitman 48 connects the lower end of the operating lever 45 with the upper brush 17. With this construction the two brushes will be moved simultaneously in the same direction when the operating lever is oscillated, but if desired the brushes may be reciprocated simultaneously in reverse direction by connecting the pitman 48 of the upper brush at one or another of the points 49 above the pivotal support of the operating lever and by connecting the pitman 47 of the lower brushes at one of the perforations 47$^a$ below the pivotal support of the operating levers. The connection of the pitman 47 of the lower brush with the operating lever will be at such point on the latter, that when said lever is operated, the lower brush will not be moved off of the upper trackway, but the two brushes will be reciprocated in reverse directions always in the same horizontal planes. When the machine is thus operated, the turning of the eggs will be effected by the reverse movements of the brushes relatively to each other. The lever 45 may be provided at its upper end with a socket 50 for the reception of a suitable handle 51. If desired however, the lever 45 may be operated by power; in which case a pitman 52 may be connected at one end with the lever 45 and at the other end with a wheel 53, the latter being driven by means of any suitable motor.

In order to counteract the buoyant effect of the water on the lower brush 18, the latter is provided with a weight 54, as shown in Fig. 3.

The tank 1 is approximately the same in width as the machine but is preferably from two and a half to three feet longer than the machine, and the latter will be secured centrally within the tank by suitable means, such as ropes or hooks.

The egg-tray 15, hereinbefore referred to, comprises a rectangular frame 55, to the end bars of which wires 56 are secured and disposed in a plane below that of the frame to receive and support the eggs. Wires 57, also secured to the end bars of the frame and disposed in a plane coincident therewith and above that of the wires 56, serve to hold the eggs in place on the wires 56. A series of transverse, corrugated wires 58 coöperate with the wires 55 and 56 to divide the tray into numerous compartments for the eggs and serve to assist in holding them in proper position while being acted upon by the brushes in the machine. The tray 15 is provided with a handle or pull 59 to facilitate the placing of the tray into the machine and its removal therefrom.

When the machine has been placed in the tank and the water heated until it has become tepid or lukewarm, a tray filled with eggs will be inserted in the manner hereinbefore described and the upper brush, which had been raised for this purpose, will be permitted to assume its normal operative position, as shown in Fig. 1. The operator will now manipulate the lever 45 and this will result in moving the two brushes simultaneously in the same direction, one over the eggs and the other under them. During the first portion of the forward movement of the brushes the upper brush will scour the upper surfaces of the eggs and also cause said eggs to turn in their bearings in the tray, the lower brush being, during this movement, out of reach of the eggs. When the lower brush 18 shall have been raised during its forward throw it will come in contact with the under faces of the eggs and during the return movement of the two brushes (the lower brush running on the upper track-ways 36-38) they will scour the respective faces of the eggs without causing the latter to turn,—the turning of the eggs being effected only when the upper brush is moving forward and the lower brush is on the track-way 35—with its bristles out of reach of the eggs. When the eggs shall have been thoroughly cleaned the upper brush 17 will be raised, as already explained, and the tray of eggs will be removed after having moved them in the water to rinse them. After the tray of eggs shall have been removed and placed on a suitable table or support, a drying tray 60 will be placed over the same and the two trays will then be reversed so as to deposit the eggs in the drying tray or rack. This tray or rack is covered with absorbent cloth and provided with a series of wooden slats 61 corresponding in number with the rows of eggs. To prevent displacement of the trays 15 and 60 the latter is provided with pins 62. The tray or rack 60 is provided at its edges with strips or flanges 63 which serve to prevent the escape of the eggs and also permit the trays to be piled one upon another.

With the use of our improved machine one man can wash from 40 to 50 cases of eggs per day and with an equal amount of labor, not more than five cases could be cleaned. We have found that the breakage of eggs, when washed with our machine, will not be over one-half of one per cent. as against from two to three per cent. when washed by hand.

Having fully described our invention what we claim as new and desire to secure by Letters-Patent, is,—

1. In a machine of the character described, the combination with a frame, of a brush movable therein, and a normally stationary egg holder mounted in said machine in position to retain the egg in position to be engaged by said brush.

2. In a machine of the character described, the combination of a frame, two brushes movable therein, one above the other and a normally stationary egg holder supported in said frame between the brushes.

3. In a machine of the character described, the combination with a tank, of a frame therein, a brush movable in said frame, and a normally stationary egg holder mounted in said frame in position to hold the eggs submerged and to subject them to the action of the brushes.

4. In a machine of the character described, the combination with a tank, of a frame mounted therein, two reciprocating brushes mounted in said frame, one above the other, and a normally stationary egg holder mounted in the frame in position to hold the eggs submerged and subject to the action of said brushes.

5. In a machine of the character described, the combination with a frame, of two brushes mounted therein, one above the other, means for reciprocating both brushes simultaneously in the same direction, and a normally stationary egg holder supported by said frame between the brushes.

6. In a machine of the character described, the combination with means for holding a number of articles to be cleaned, of upper and lower brushes, means for moving said brushes simultaneously in contact with opposite faces of the articles to be cleaned, and means for removing one of said brushes out of reach of the articles to be cleaned during a portion of its travel.

7. In a machine of the character described, the combination with means for supporting a number of articles to be cleaned, of a reciprocating brush over said supporting means, a reciprocating brush under said supporting means, means for reciprocating said brushes, and means operating automatically to raise and lower the lower brush.

8. In a machine of the character described, the combination with a framework, and supports vertically adjustable in said framework, a removable tray to be sustained by said adjustable supports, of brushes above and below the said supports, and means for reciprocating said brushes in contact with articles held by said tray.

9. In a machine of the character described, the combination with framework, a removable tray for articles to be cleaned and supports in the framework for said tray, of a reciprocating brush mounted in the frame, work over the tray supports, means for permitting vertical movement and adjustment of said brush, and means for reciprocating the brush.

10. In a machine of the character described, the combination with framework, a removable tray for articles to be cleaned, and supports in the framework for said tray, of a reciprocating brush mounted in the framework over the tray support, a reciprocating brush below the tray support, wheels carried by said last mentioned brush, track-ways for said wheels disposed in different horizontal planes, the lower track-ways having inclined portions and the upper track-ways having hinged portions terminating in proximity to the upper ends of the inclined portions of the lower track-ways, whereby the lower brush will be made to contact with articles in the tray when said brush is moved in one direction and permitted to drop and move out of reach of the articles in the tray when moving in the other direction.

11. In a machine of the character described, the combination with framework, a removable tray and supports in the framework for said tray, of guideways to direct the tray to its supports in the framework, means for preventing displacement of the tray on its supports, reciprocating brushes above and below the tray supports and means for reciprocating said brushes.

12. In a machine of the character described, the combination with a framework, of reciprocating brushes mounted therein, a tray provided with open-work supports for eggs, means in the framework for supporting said tray between the brushes, means for permitting the insertion and removal of the tray and its contents and means for reciprocating the brushes.

13. In apparatus for cleaning eggs, the combination with a tank, of reciprocating brushes therein, an open work tray, means for supporting said tray and its contents between the brushes, means for reciprocating the brushes, means for permitting the insertion and removal of said tray and its contents, and a drying rack adapted to coöperate with said tray to receive the eggs therefrom when said rack shall have been removed from the machine.

In testimony whereof, we have signed this specification in the presence of two subscribing witnesses.

EDWARD M. BOIES.
WILLIAM W. BOIES.

Witnesses:
C. A. THOMPSON,
D. A. DONNER.